United States Patent
Pomme

(10) Patent No.: US 10,047,675 B2
(45) Date of Patent: Aug. 14, 2018

(54) POWER PLANT HAVING A TWO-STAGE COOLER DEVICE FOR COOLING THE ADMISSION AIR FOR A TURBOSHAFT ENGINE

(71) Applicant: AIRBUS HELICOPTERS, Marignane (FR)

(72) Inventor: Vincent Pomme, Virtolles (FR)

(73) Assignee: AIRBUS HELICOPTERS, Marignane (FR)

( * ) Notice: Subject to any disclaimer, the term of this patent is extended or adjusted under 35 U.S.C. 154(b) by 354 days.

(21) Appl. No.: 14/934,606

(22) Filed: Nov. 6, 2015

(65) Prior Publication Data
US 2016/0131032 A1 May 12, 2016

(30) Foreign Application Priority Data
Nov. 7, 2014 (FR) ..................... 14 02533

(51) Int. Cl.
| | |
|---|---|
| *F02C 6/18* | (2006.01) |
| *F02C 6/12* | (2006.01) |
| *F02C 7/143* | (2006.01) |
| *F02C 3/32* | (2006.01) |
| *F02C 6/02* | (2006.01) |
| *F02C 6/20* | (2006.01) |
| *F02C 7/32* | (2006.01) |

(52) U.S. Cl.
CPC .................. *F02C 6/18* (2013.01); *F02C 3/32* (2013.01); *F02C 6/02* (2013.01); *F02C 6/12* (2013.01); *F02C 6/206* (2013.01); *F02C 7/143* (2013.01); *F02C 7/32* (2013.01); *Y02T 50/671* (2013.01); *Y02T 50/675* (2013.01)

(58) Field of Classification Search
CPC .......... F02C 7/143; F02C 7/185; F02C 6/206; F02C 3/32; F02C 6/18; F02C 6/12; F02C 6/02; F05D 2260/205; F05D 2260/211; F05D 2260/213; Y02T 50/675; F25B 2400/02; B64D 13/006; B64D 2013/06
USPC ................................................... 62/500, 501
See application file for complete search history.

(56) References Cited

U.S. PATENT DOCUMENTS

| | | | |
|---|---|---|---|
| 4,342,200 A | * | 8/1982 Lowi, Jr. ............ | B60H 1/00007 62/191 |
| 4,490,989 A | | 1/1985 Keen | |
| | | (Continued) | |

FOREIGN PATENT DOCUMENTS

EP         2295765         3/2011

OTHER PUBLICATIONS

French Search Report for French Application No. FR 1402533, Completed by the French Patent Office on Aug. 4, 2015, 6 Pages.

*Primary Examiner* — Carlos A Rivera
(74) *Attorney, Agent, or Firm* — Brooks Kushman P.C.

(57) ABSTRACT

A power plant having at least one compressor, at least one fuel-burning engine, and a cooler device for cooling admission air for the engine, the engine being provided with a combustion chamber. The cooler device is constituted by a heat engine having three heat sources arranged between two compression stages of the compressor and including a refrigerant fluid and two evaporators. The admission air flows in succession through the two evaporators between the two compression stages firstly to cool the admission air between the two compression stages prior to being injected into the combustion chamber, and secondly to vaporize the refrigerant fluid.

21 Claims, 2 Drawing Sheets

(56) References Cited

U.S. PATENT DOCUMENTS

| | | | | |
|---|---|---|---|---|
| 4,592,204 A | * | 6/1986 | Rice | F01D 5/185 |
| | | | | 60/39.17 |
| 4,653,268 A | * | 3/1987 | Nakamura | F01K 21/047 |
| | | | | 60/39.53 |
| 4,765,148 A | * | 8/1988 | Ohashi | F25B 1/06 |
| | | | | 62/114 |
| 4,949,544 A | * | 8/1990 | Hines | F01K 21/047 |
| | | | | 60/728 |
| 8,438,849 B2 | | 5/2013 | Kaplan et al. | |
| 8,813,503 B2 | | 8/2014 | Jones | |
| 2004/0011046 A1 | | 1/2004 | Pierson | |
| 2008/0178590 A1 | * | 7/2008 | Chillar | F01D 25/12 |
| | | | | 60/597 |
| 2010/0242479 A1 | | 9/2010 | Ast et al. | |
| 2013/0074511 A1 | * | 3/2013 | Tanaeva | F01D 15/005 |
| | | | | 60/772 |
| 2015/0191254 A1 | * | 7/2015 | Vaisman | B64D 33/08 |
| | | | | 62/115 |

\* cited by examiner

POWER PLANT HAVING A TWO-STAGE COOLER DEVICE FOR COOLING THE ADMISSION AIR FOR A TURBOSHAFT ENGINE

CROSS REFERENCE TO RELATED APPLICATION

This application claims priority to French patent application No. FR 14 02533 filed on Nov. 7, 2014, the disclosure of which is incorporated in its entirety by reference herein.

BACKGROUND OF THE INVENTION (1) Field of the Invention

The present invention relates lies in the field of power plants, and more particularly heat exchanger devices for use in power plants. The present invention relates in particular to a power plant having a two-stage cooler device for cooling the admission air for at least one fuel-burning engine of the power plant. The present invention also relates to a two-stage method of cooling the admission air for at least one fuel-burning engine of such a power plant.

The power plant is intended more particularly for a rotary wing aircraft and it serves to cool the air admitted into at least one gas turbine of the power plant between two compression stages for compressing the admission air, upstream from a combustion chamber in each gas turbine.

(2) Description of Related Art

It is known that increasing the pressure of admission air prior to injecting it into the combustion chamber of a fuel-burning engine increases the efficiency of the engine and also the power that it can deliver. In contrast, compressing admission air leads to an increase in its temperature, and consequently to a decrease in its density. Cooling the admission air after it has been compressed serves once more to improve the effectiveness of the heat engine and to increase its efficiency and the power it delivers.

For example, with road vehicle engines, an air-air heat exchanger is often used for cooling the admission air leaving a turbocharger prior to entering into the combustion chamber of the engine.

Likewise, in known manner in the field of turboshaft engines, an air-air heat exchanger is used to cool the admission air leaving an intermediate stage of a compressor prior to being reinjected into the following stage of the compressor, upstream from the combustion chamber of the engine.

In both of those examples, cooling the admission air serves at the end of the compression stage to procure admission air at a lower temperature, thereby enabling the power delivered by the engine to be increased. That type of heat exchanger for cooling air is generally referred to as an "intercooler". Such an intercooler is often an air-air heat exchanger, but it could also be an air-liquid heat exchanger.

Document U.S. Pat. No. 8,813,503 is also known, which describes a method and a system for managing the temperature to which admission air for a turboshaft engine is cooled in order to limit condensation from the admission air on passing through an intercooler situated between two compression stages of a gas turbine. That system serves in particular to control the temperature of the air in a cooler for cooling the admission air that is situated upstream from the two compression stages and the intercooler.

Unfortunately, using such an intercooler on board a rotary wing aircraft for the purpose of increasing the power delivered by the turboshaft engine(s) of the aircraft is difficult, and as a result is not used at present.

Firstly, incorporating an intercooler, which is usually an air-air heat exchanger, in the vicinity of the turboshaft engine of an aircraft, and in particular in the proximity of the zone containing its compressors, is difficult. The dimensions of the intercooler can be large if the intercooler is to be capable of achieving an advantageous increase in power from the engine. Such dimensions are then unfavorable for installing the intercooler in an aircraft.

Furthermore, the weight of the intercooler can also be considerable and the ratio of the resulting power increase to increase in aircraft weight is small and possibly close to zero.

As a result, the dimensions of the intercooler need to be limited in order to enable an intercooler to be installed in a rotary wing aircraft. However, the increase in the power from the engine of the aircraft is then small and the advantage of such an installation becomes limited.

Finally, when installing an intercooler in a rotary wing aircraft, it is often found to be complex to convey cooling air to the intercooler, and that can limit its effectiveness, and consequently the improvement in power obtained from the engine of the aircraft.

Furthermore, an intercooler, and in general manner a heat exchanger, constitutes a heat engine that uses only one source of heat. The source of heat is generally ambient air in an air/air heat exchanger. Such a heat engine can be referred to as an engine having a single heat source. Such single heat source heat engines are limited to exchanging heat between two fluids.

There also exist heat engines that use a plurality of heat sources. Such heat engines are capable, when they provide drive, of converting heat energy into mechanical energy, or else, when they receive drive, of converting mechanical energy into heat energy. Such heat engines use a fluid that is subjected to cyclical transformations during which the fluid exchanges energy with the outside in the form of work, and exchanges energy with the heat sources in the form of heat.

Heat engines having two heat sources, i.e. using two heat sources at different temperatures, are also known, such as for example a spark ignition engine, a steam power station, or a refrigerator machine.

Heat engines are also known that make use of three heat sources. Such heat engines using three heat sources are used in particular as refrigerator machines using a known ejector refrigerating cycle.

Such an ejector refrigerating cycle can be summarized as follows:

at the outlet from a condenser, a refrigerant fluid in liquid form is directed firstly to a drive loop and secondly to a refrigerating loop;

the drive loop includes a pump that compresses a first portion of the refrigerant fluid and a first evaporator in which the first portion of the refrigerant fluid is transformed into gaseous form;

the refrigerating loop includes an expander that expands a second portion of the refrigerant fluid and a second evaporator in which the second portion of the refrigerant fluid is transformed into gaseous form; and thereafter the first portion of the refrigerant fluid is used as driving refrigerant fluid in an ejector serving firstly to compress and drive the second portion of refrigerant fluid and secondly to mix together the two portions of refrigerant fluid prior to them entering the condenser so as to transform the refrigerant fluid into liquid form, the cycle thus being looped.

The three heat sources are used respectively in the two evaporators and in the condenser for exchanging heat energy with the refrigerant fluid.

Such heat engines, whether they have two or three heat sources, make use of thermodynamic cycles such as the "Carnot" cycle or the "Rankine" cycle.

The Rankine cycle is a thermodynamic cycle that is similar to the Carnot cycle. It differs therefrom by replacing two constant-temperature (isothermal) transformations in the Carnot cycle with two constant-pressure (isobaric) transformations. The cycle is thus made up of four successive transformations: adiabatic compression; constant-pressure vaporization; adiabatic expansion; and constant-pressure liquefaction.

Industrial applications of the Rankine cycle include for example systems making use of the heat that is lost by industrial processes in order to provide additional electrical power supply. The Rankine cycle is used in particular in steam power stations, including nuclear power stations.

The Rankine cycle is also used with organic fluids having a vaporization temperature lower than that of water. The temperatures of the heat sources used with such a Rankine cycle can thus be low.

By way of example, Document U.S. Pat. No. 8,438,849 describes a heat recovery system using two heat sources comprising a high pressure turbine and a low pressure turbine. Those two turbines operate using the Rankine cycle and they serve to generate mechanical energy that is then transformed into electricity.

Also known is Document US 2010/0242479, which describes a system for recovering energy by using at least two heat sources at different temperatures and a plurality of Rankine cycles in cascade. That energy recovery system serves to generate both mechanical energy that can be transformed into electricity, and also heat energy for the purpose of cooling and/or heating an additional fluid via one or more heat exchangers.

Furthermore, an absorber machine can also be used for cooling the admission air for a fuel-burning engine between two compression stages of the admission air, as described in Document EP 2 295 765. That absorber machine includes in particular two evaporators, two condensers, a pump, and two expanders. That absorber machine uses ammonia ($NH_3$) or else lithium bromide (LiBr) which have the disadvantage of being fluids that are highly toxic. Nevertheless, such an absorber machine is generally of large dimensions, so its overall size and weight are then incompatible with the constraints required for being incorporated in an aircraft. Furthermore, the operation of an absorber machine requires a set-up that is stationary, in particular for absorption of the refrigerant by the absorbent. This requirement is prohibitive for integrating in a moving vehicle.

Finally, Document U.S. Pat. No. 4,490,989 describes a system for heating and air conditioning an aircraft cabin using a heat engine comprising an evaporator, a condenser, and a compressor, through which a refrigerant fluid circulates. The cabin of the aircraft may be fed with cooled air leaving the evaporator or with air from outside the aircraft heated by the exhaust gas of a fuel-burning engine of the aircraft.

BRIEF SUMMARY OF THE INVENTION

An object of the present invention is thus to provide a device enabling the above-mentioned limitations to be overcome, the device making it possible and advantageous to incorporate the principle of an intercooler on board a rotary wing aircraft in order to obtain an increase in power.

According to the invention, a power plant comprises at least one compressor and at least one fuel-burning engine together with a cooler device for cooling the admission air for each engine, each engine being provided with a combustion chamber. Each compressor has at least two compression stages in order to compress the admission air before injecting it into the combustion chamber of each engine.

The cooler device is remarkable in that it forms a heat engine having three heat sources and including in particular a refrigerant fluid, first pipes, and two evaporators. A first pipe connects a first compression stage of a compressor to a first evaporator of the cooler device. First pipes also connect the first evaporator to a second evaporator of the cooler device and also the second evaporator to a second compression stage of the compressor. The admission air then flows through the first pipes and in succession through both evaporators of the cooler device firstly to vaporize the refrigerant fluid and secondly to cool the admission air between the two compression stages.

The refrigerant fluid used by the cooler device may be a halogenated fluid of the hydrofluorocarbide (HFC) type, e.g. as known under one of the references R134a, R1234, R245. Such a halogenated fluid presents toxicity characteristics that are compatible with use in moving vehicles, and environmental characteristics that are also compatible with present standards and known future standards. In particular, it is authorized for use in vehicles and in aircrafts.

Other refrigerant fluids could also be used, such as ammonia, but they present toxicity and environmental characteristics that are not satisfactory. In particular, the toxicity of halogenated fluids of the HFC type is less than that of ammonia or indeed of lithium bromide.

The cooler system is thus made up of two heat exchangers of the evaporator type through which the admission air for the engine and the refrigerant fluid both flow. The refrigerant fluid is caused to circulate by means of a heat engine having three heat sources based on principles known in the prior art, the admission air being caused to flow by the first compression stage of a compressor of the power plant.

The first evaporator of the cooler device thus constitutes a first stage for cooling the admission air for the engine, and the second evaporator finishes off the cooling of the admission air, constituting a second stage for cooling the admission air. The cooling serves to cool the admission air prior to it entering the second compression stage, and consequently to obtain admission air at the end of the compression stage and entering the combustion chamber of the engine that is at a lower temperature, thereby enabling the power delivered by the engine to be increased significantly.

The first and second evaporators of the cooler device also serve as generators of refrigerant fluid gas, transforming the refrigerant fluid from a liquid phase to a gaseous phase.

Advantageously, the use of a cooler device constituted by a heat engine having three heat sources serves to replace the work that is generally consumed by a compressor, firstly with a much smaller amount of work that is consumed by a pump, and secondly with heat delivered to the evaporators at medium or high temperature.

Specifically, the cooler device consumes less energy for cooling the admission air and consequently for increasing the power delivered by the engine. Consequently, the balance between the power consumed by the cooler device and the additional power delivered by the engine is positive and favorable for installing such a cooler device within a power plant, in particular a power plant for a rotary wing aircraft.

Since the cooler device is a heat engine having three heat sources it also has a pump, an expander, compression and drive means, a condenser, and second pipes. Second pipes connect firstly the condenser to the pump, the pump to the first evaporator, and the first evaporator to the compression and drive means. Second pipes also connect the condenser to the expander, the expander to the second evaporator, and the second evaporator to the compression and drive means. Finally, a second pipe connects the compression and drive means to the condenser.

The refrigerant fluid thus circulates in the second pipes and passes through the components of the cooler device.

The condenser transforms a first gaseous phase of the refrigerant fluid into a liquid phase by exchanging heat energy with a first heat source. Thereafter the refrigerant fluid is split into two portions.

The pump compresses a first portion of the refrigerant fluid, this refrigerant fluid being in liquid form, thereby increasing its pressure. The first evaporator then transforms this first portion of the refrigerant fluid into a second gaseous phase at high pressure, by exchanging heat energy with a second heat source.

In parallel, the expander transforms a second portion of the refrigerant fluid, the refrigerant fluid then likewise being in liquid form, thereby reducing its pressure. The second evaporator transforms this second portion of the refrigerant fluid into a third gaseous phase at low pressure, by exchanging heat energy with a third heat source.

Below, and for simplification purposes, the terms "first gaseous phase", "second gaseous phase", and "third gaseous phase" are used to designate the refrigerant fluid respectively in the first gaseous phase, the second gaseous phase, and the third gaseous phase.

The compression and drive means compress and drive the third gaseous phase at low pressure of the refrigerant fluid by using the second gaseous phase at high pressure of the same refrigerant fluid. The compression and drive means also mix the third gaseous phase at low pressure with the second gaseous phase at high pressure of the refrigerant fluid so as to form the first gaseous phase of the refrigerant fluid.

Finally, this first gaseous phase of the refrigerant fluid circulates through the condenser in order to be condensed and form the liquid phase of the refrigerant fluid, thus restarting a new cycle with three heat sources.

The cooler device thus has two loops, a primary or drive loop, and a secondary or refrigeration loop.

The primary loop comprises the pump, the first evaporator, the compression and drive means, and also the condenser. The refrigerant fluid circulates at high pressure in the primary loop, in particular from the pump to the compression and drive means.

The secondary loop comprises the expander, the second evaporator, the compression and drive means, and the condenser. The refrigerant fluid circulates at low pressure in the secondary loop, in particular from the expander to the compression and drive means.

The cooler device thus operates in co-operation with three heat sources. By way of example, the first heat source is the ambient air surrounding the power plant, this first heat source absorbing the heat energy of the refrigerant fluid by means of the condenser. The second and third heat sources are successively the admission air for the engine, and delivering the heat energy to the refrigerant fluid respectively by means of the first and second evaporators. The second heat source is the admission air leaving the first compression stage and entering the intermediate cooler device, while the third heat source is the admission air leaving the first evaporator.

It may be observed that the third heat source is at a temperature lower than the second heat source, the admission air constituting this third heat source being cooled on passing through the first evaporator.

Preferably, but not exclusively, the primary loop operates using the Rankine cycle. The Rankine cycle makes it possible to recover mechanical power from a heat source. In the cooler device of the invention, the heat source is the second heat source and the mechanical power is then used in the secondary loop in order to compress a portion of the refrigerant fluid in the gaseous phase.

In a first embodiment of the invention, the compression and drive means comprise an ejector that operates on known principles. The second gaseous phase at high pressure of the refrigerant fluid is accelerated in a convergent-divergent nozzle of the ejector, thereby creating a pressure reduction in a mixing zone, and having the effect of sucking in the third gaseous phase at low pressure of the refrigerant fluid. The second and third gaseous phases of the refrigerant fluid are thus mixed together. This leads to an increase in the pressure of the mixture of the refrigerant fluid and to a reduction in its speed.

In a second embodiment of the invention, the compression and drive means comprise a positive displacement expander connected to the first evaporator by a second pipe and a positive displacement compressor connected to the second evaporator by another second pipe. The positive displacement expander and the positive displacement compressor are connected via a second pipe to the condenser. The positive displacement expander and the positive displacement compressor are also mechanically constrained together in rotation, e.g. by means of a connecting shaft.

The positive displacement expander is driven in rotation by the second gaseous phase at high pressure of the refrigerant fluid leaving the first evaporator, this second gaseous phase at high pressure of the refrigerant fluid then expanding in the positive displacement expander. The positive displacement expander drives the positive displacement compressor in rotation by means of the connection shaft. The third gaseous phase at low pressure of the refrigerant fluid leaving the second evaporator circulates through the positive displacement compressor that, as a result of its rotation, compresses it and consequently drives this third gaseous phase of the refrigerant fluid.

The second gaseous phase of the refrigerant fluid leaves the positive displacement expander via a second pipe. Likewise, the third gaseous phase of the refrigerant fluid leaves the positive displacement compressor via a second pipe. These two second pipes are connected together to form a single second pipe, thus enabling the second gaseous phase and the third gaseous phase of the refrigerant fluid to mix together, and then circulate towards the condenser.

After the compression and drive means, all of the refrigerant fluid is condensed by heat exchanger with the first heat source by means of the condenser. Advantageously, the condenser may be remote from the position occupied by the engine, thus, for example, making it easier to incorporate on board a rotary wing aircraft, and also making it easier to optimize its thermal effectiveness.

Furthermore, the mechanical power generated by the second gaseous phase of the refrigerant fluid expanding in the positive displacement expander can be greater than the mechanical power needed for compressing and driving the third gaseous phase of the refrigerant fluid. As a result, the surplus mechanical power can be used by one or more auxiliary systems of the cooler device.

For this purpose, the cooler device may include a mechanical transmission shaft that is mechanically connected to rotate the positive displacement expander. The mechanical transmission shaft can thus deliver this surplus mechanical power needed for operating an auxiliary system.

The cooler device may also include clutch means for constraining the positive displacement expander and the mechanical transmission shaft together in rotation. Thus, the mechanical transmission shaft and the positive displacement expander can be mutually engaged or disengaged in rotation firstly depending on whether or not surplus mechanical power is available and secondly depending on the auxiliary system's need for mechanical power. Such clutch means may for example comprise a magnetic coupling. Advantageously, such a magnetic coupling avoids using a mechanical transmission shaft leaving the compression and drive means, and thus avoids the need for sealing means such as a rotary gasket. The compression and drive means constituted by the positive displacement expander and the positive displacement compressor can thus be leaktight, and consequently more reliable.

By way of example, an auxiliary system may be a fan system for ventilating the condenser in order to improve the thermal effectiveness of the condenser.

It is also possible to use a fraction of the refrigerating power of the refrigerant fluid for at least one additional heat exchange function. For this purpose, the power plant includes at least one third pipe connected to a second pipe situated between the condenser and the pump. The refrigerant fluid can then circulate via this third pipe to an additional heat exchanger system and then return and circulate through a second pipe before the pump.

By way of example, the power plant includes at least one main power transmission gearbox, and a third pipe connects the second pipe to the main gearbox. The refrigerant fluid circulates in the third pipe to the main gearbox in order to cool it. This refrigerating power of the refrigerant fluid can be used in the context of emergency cooling or indeed for additional cooling in the event of a temporary overload of the main gearbox.

In another example, the power plant is for a rotary wing aircraft having at least one cabin and at least one heat exchanger for cooling the cabin, with a third pipe connecting the second pipe to each heat exchanger. The refrigerant fluid circulates in the third pipe to each of the heat exchangers, thereby enabling the cabin of the aircraft to be cooled. This refrigerating power of the refrigerant fluid can be used to replace a conventional air conditioner device for the cabin, thus achieving firstly a saving in weight by making common use of the cooler device for cooling the admission air for the engine, and secondly optimizing the consumption of energy as used on board the aircraft. This cabin air conditioning function is obtained without taking off any additional energy, with the cooler device acting simultaneously to provide two cooling functions.

In the same architecture, the refrigerant fluid could also be used to cool other equipment in an aircraft, such as electronic equipment and/or avionics equipment, for example.

Furthermore, it is also possible for the condenser to make use of a fraction of the heat discharged during the transformation of the third gaseous phase of the refrigerant fluid into the first liquid phase of the refrigerant fluid in order to perform at least one auxiliary heater function. For this purpose, the condenser is a heat exchanger for exchanging heat between the refrigerant fluid and a secondary fluid, the power plant having a fourth pipe connected to the condenser in order to channel the secondary fluid leaving the condenser. The secondary fluid can then circulate in the fourth pipe to an auxiliary device in order to transmit the heat absorbed in the condenser.

For example, when the power plant is for a rotary wing aircraft having at least one cabin, then the fourth pipe enables the secondary fluid to be channeled and directed to the cabin in order to heat it. This principle for heating the cabin of the aircraft can be used as a replacement for a conventional heater device of the cabin, e.g. a device using a fraction of the air compressed by the compressor of the engine, thus making it possible to avoid excess consumption of fuel by the engine.

The secondary fluid may be the ambient air surrounding the power plant. The condenser is then a heat exchanger between the refrigerant fluid and ambient air, the ambient air being directed by the fourth pipe to the cabin of the aircraft in order to heat it.

The power plant of the invention thus serves mainly to cool the admission air for a fuel-burning engine, thus providing a significant increase in the power delivered by that engine. In addition, the condenser of the cooler device for cooling this admission air can be located remotely, thereby making the cooler device easier to incorporate in a rotary wing aircraft, while also optimizing the thermal effectiveness of the condenser.

Furthermore, by means of the cooler device, the power plant of the invention makes it possible both to deliver heat power for generating cooling capacity or for additional heating, and also to deliver additional mechanical power.

The present invention also provides a method of cooling admission air for a fuel-burning engine in a power plant. The method comprises the following steps:

comprising the admission air for the engine in a compressor of the power plant, the compressor having two compression stages;

causing a refrigerant fluid to circulate in a cooler device for cooling the admission air for the engine; and causing the admission air to flow in succession through two evaporators of the cooler device between the two compression stages in order firstly to vaporize the refrigerant fluid and secondly to cool the admission air.

Furthermore, during the method of cooling the admission air for a fuel-burning engine of a power plant, the following steps are performed:

condensing the refrigerant fluid by means of a condenser, by exchanging heat energy with a first heat source;

compressing a first portion of the refrigerant fluid by means of a pump;

vaporizing the first portion of the refrigerant fluid by means of a first evaporator by exchanging heat energy with a second heat source, the second heat source being the admission air;

expanding a second portion of the refrigerant fluid by means of an expander;

vaporizing the second portion of the refrigerant fluid by means of a second evaporator by exchanging heat energy with a third heat source, the third heat source being the admission air; and compressing and driving the second portion of the refrigerant fluid by means of the first portion of the refrigerant fluid, and then mixing together the second portion of the refrigerant fluid and the first portion of the refrigerant fluid.

In a first implementation of the method, the following step is performed: compressing and driving the second portion of the refrigerant fluid by means of the first portion of the refrigerant fluid, and mixing together the second portion of the refrigerant fluid and the first portion of the refrigerant fluid by means of an ejector.

In a second implementation of the method, the following step is performed: compressing and driving the second portion of the refrigerant fluid by means of the first portion of the refrigerant fluid by using a positive displacement expander and a positive displacement compressor that are mechanically constrained together in rotation, the positive displacement expander being driven in rotation by the first portion of the refrigerant fluid, and the second portion of the refrigerant fluid circulating through the positive displacement compressor, and then mixing together the second portion of the refrigerant fluid and the first portion of the refrigerant fluid.

In addition, it is possible to use a portion of the mechanical energy available from the positive displacement expander, the positive displacement expander being mechanically connected in rotation with a mechanical transmission shaft.

Furthermore, it is possible to use the heat discharged during condensation of the refrigerant fluid for an auxiliary heater function, such as heating a cabin of an aircraft.

In addition, it is possible to use a portion of the heat energy of the refrigerant fluid for at least one additional heat exchange function. For example, a portion of the heat energy of the refrigerant fluid may be used for cooling a main power transmission gearbox of the power plant, or else for cooling a cabin of the aircraft.

BRIEF DESCRIPTION OF THE SEVERAL VIEWS OF THE DRAWINGS

The invention and its advantages appear in greater detail from the context of the following description of examples given by way of illustration and with reference to the accompanying figures, in which.

Elements shown in more than one of the figures are given the same references in each of them.

Figure 1:
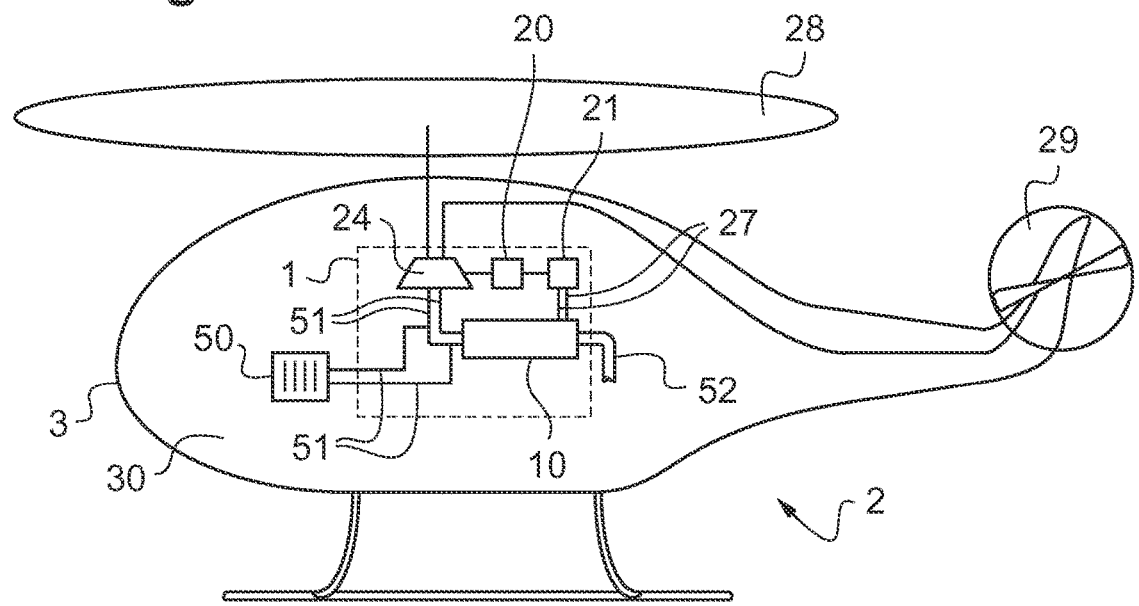
FIG. 1 shows a rotary wing aircraft having a power plant of the invention.

In FIG. 1, a rotary wing aircraft 2 is shown, which aircraft 2 has a main rotor 28 located above a fuselage 3 and an anti-torque tail rotor 29 situated at the rear end of a tail boom.

The aircraft 2 also has a power plant 1 and a cabin 30 located inside the fuselage 3.

DETAILED DESCRIPTION OF THE INVENTION

The power plant 1 comprises a compressor 21, a fuel-burning engine 20, a main power transmission gearbox 24, and a cooler device 10 for cooling the air admitted into the engine 20. The engine 20 is mechanically connected to the main gearbox 24 in order to set both the main rotor 28 and the tail rotor 29 into rotation.

Figure 2:
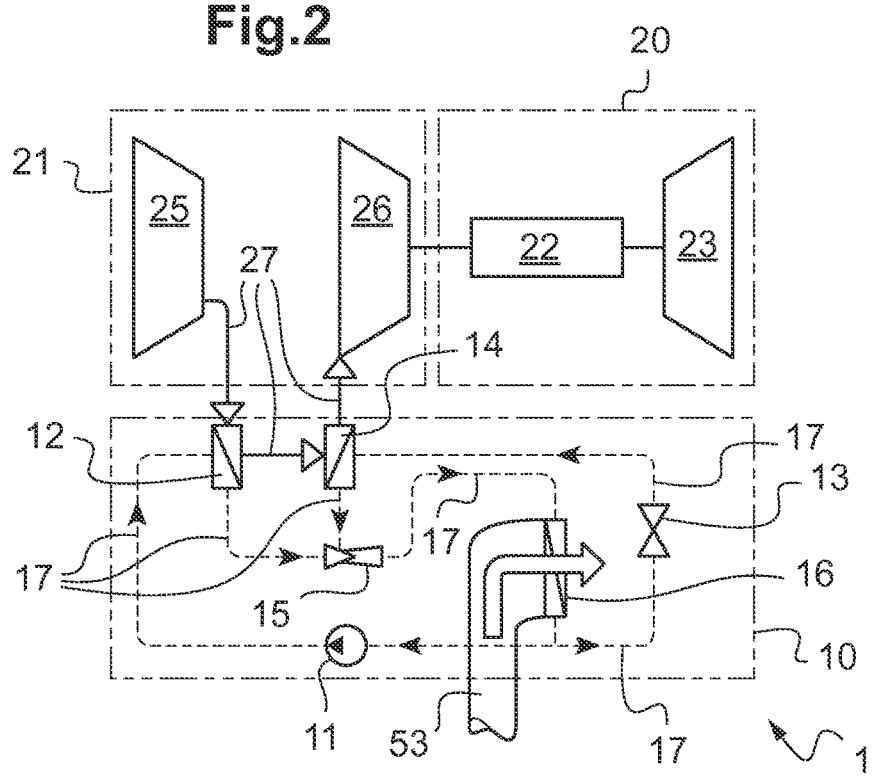
FIGS. 2 and 3 show two embodiments of the power plant of the invention.
Figure 3:
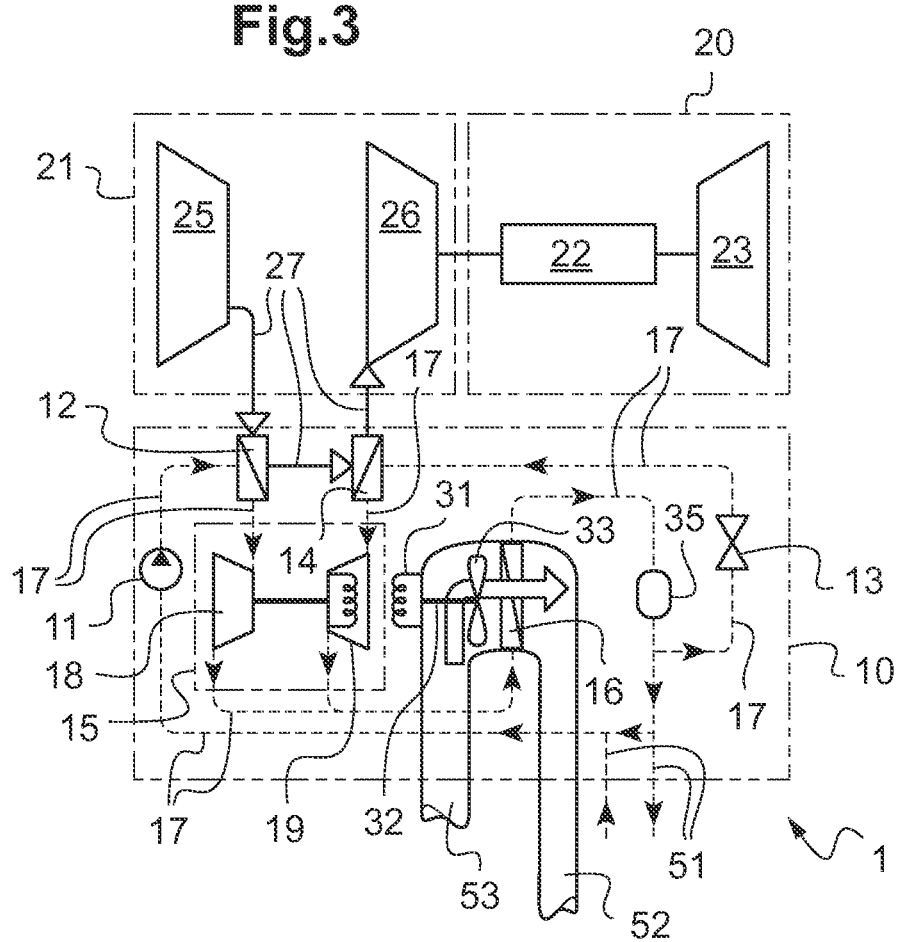

Two embodiments of the power plant 1 are shown, respectively in FIGS. 2 and 3.

In common to both of these embodiments of the power plant 1, each engine 20 is a turboshaft engine having a combustion chamber 22 and an expansion turbine 23. Each compressor 21 has two compression stages 25 and 26 so as to compress the admission air prior to injecting into the combustion chamber 22.

The cooler device 10 is constituted by two loops. A primary loop comprises a pump 11, a first evaporator 12, a condenser 16, together with compression and drive means 15. A secondary loop comprises an expander 13, a second evaporator 14, the condenser 16, and the compression and drive means 15.

The cooler device 10 also comprises first and second pipes 27 and 17. The first pipes 27 connect the first compression stage 25 to the first evaporator 12, the first evaporator 12 to the second evaporator 14, and the second evaporator 14 to the second compression stage 26.

The second pipes 17 serve firstly in the primary loop to connect the condenser 16 to the pump 11, the pump 11 to the first evaporator 12, and the first evaporator 12 to the compression and drive means 15, and secondly, in the secondary loop, to connect the condenser 16 to the expander 13, the expander 13 to the second evaporator 14, and the secondary evaporator 14 to the compression and drive means 15. A second pipe 17 also connects the compression and drive means 15 to the condenser 16 in order to close the primary loop and the secondary loop.

The cooler device 10 thus forms a heat engine with three heat sources, having its primary loop operating in the Rankine cycle.

A refrigerant fluid circulates through the cooler device 10 and more precisely in the primary loop and the secondary loop, passing through all of the components 11, 12, 13, 14, 15, and 16 of the cooler device 10, and also through the second pipe 17.

The condenser 16 enables the refrigerant fluid to be condensed into a liquid phase, delivering heat energy to a first heat source constituted by the ambient air surrounding the power plant 1. Thereafter, the refrigerant fluid splits into two portions in the secondary pipe 17.

In the primary loop, the pump 11 compresses the refrigerant fluid, which then transforms into the gaseous phase at high pressure in the first evaporator 12, absorbing heat energy from a second heat source constituted by the admission air leaving the first compression stage 25.

In the secondary loop, the expander 13 expands the refrigerant fluid, which is then transformed into a gaseous phase at low pressure in the secondary evaporator 14 by absorbing heat energy from a third heat source constituted by the admission air leaving the first evaporator 12.

The compression and drive means 15 compress and drive the refrigerant fluid circulating in the secondary loop by means of the refrigerant fluid circulating in the primary loop. The compression and drive means 15 also mix together the refrigerant fluid flowing in the primary and the secondary loops, prior to directing the fluid to the condenser 16.

Finally, the refrigerant fluid circulates once more through the condenser 16 and restarts a new three-heat source cycle.

The admission air flows through the compressor 21 and the cooler device 10. The admission air passes in succession through the two evaporators 12, 14, between the two compression stages 25 and 26, firstly so as to vaporize the refrigerant fluid and secondly so as to cool the admission air between the two compression stages 25 and 26.

This cooling of the admission air between the two compression stages 25 and 26 serves to increase the power delivered by the turboshaft engine 20.

In the first embodiment of the power plant 1, as shown in FIG. 2, the compression and drive means 15 comprise an ejector, e.g. in the form of a convergent-divergent nozzle.

In the second embodiment of the power plant 1, as shown in FIG. 3, the compression and drive means 15 comprise a positive displacement expander 18 connected to the first evaporator 2 by a second pipe 17 and a positive displacement compressor 19 connected to the second evaporator 14 by a second pipe 17. The positive displacement expander 18 and the positive displacement compressor 19 are mechanically constrained together in rotation and they are connected by a second pipe 17 to the condenser 16. The positive displacement expander 18 is thus driven in rotation by the refrigerant fluid leaving the first evaporator 12, the positive displacement expander 18 driving the positive displacement compressor 19 in rotation, thereby serving to compress and drive the refrigerant fluid leaving the second evaporator 14. Thereafter, the refrigerant fluid coming from the primary and secondary loops is mixed together and directed to the condenser 16.

In this second embodiment of the power plant 1, the cooler device 10 also has a mechanical transmission shaft 32, clutch means 31, an inlet pipe 53, a fan system 33, and a fourth pipe 52.

The clutch means 31 are constituted by a magnetic coupling constraining the positive displacement expander 18 in rotation with the mechanical transmission shaft 32. The fan system 33 is constrained in rotation with the mechanical transmission shaft 32.

The input pipe 53 and the fourth pipe 52 are connected to the condenser 16. The inlet pipe 53 serves to channel and direct a portion of the ambient air surrounding the power plant 1 to the condenser 16, and the fourth pipe 52 serves to channel the ambient air leaving the condenser 16.

The fan system 33 serves to activate the flow of ambient air through the inlet pipe 53, thus improving the thermal effectiveness of the condenser 16.

Furthermore, as shown in FIG. 1, the fourth pipe 52 serves to direct the ambient air leaving the condenser 16 to the cabin 30 of the aircraft 2 in order to heat it.

In this second embodiment of the power plant 1, the cooler device 10 has a separator 35 located after the condenser 16 on a second pipe 17. The separator 35 serves to separate the liquid and gaseous phases of the refrigerant fluid and at its outlet it delivers only the liquid phase of the refrigerant fluid. Thus, after the separator 35, only the liquid phase of the refrigerant fluid circulates in the second pipe 17 to the pump 11 and the expander 13. This absence of gaseous phase in the second pipe 17 is of importance in particular for effective operation of the pump 11.

In this second embodiment of the power plant 1, the power plant 1 has a third pipe 51 connected to a second pipe 17 situated between the condenser 16 and the pump 11. This third pipe 51 is also shown in FIG. 1, and it serves to connect the second pipe 17 to the main gearbox 24 and to a heat exchanger 50 situated in the cabin 30 of the aircraft 2.

The refrigerant fluid thus circulates in a third pipe 51 from a second pipe 17 so as to pass through the main gearbox 24 and the heat exchanger 50 and return to the second pipe 17 via a third pipe 51.

The refrigerant fluid thus serves to cool the main gearbox 24 and also the cabin 30 of the aircraft 2.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A power plant comprising at least one compressor, at least one fuel-burning engine, and a cooler device for cooling admission air for each fuel-burning engine, each fuel-burning engine being provided with a combustion chamber, each compressor having at least two compression stages in order to compress the admission air prior to injecting the compressed admission air into the combustion chamber of each fuel-burning engine, the cooler device including a refrigerant fluid, first pipes and second pipes and also two evaporators, a pump, an expander, and a condenser, the first pipes connecting a first compression stage to a first evaporator, the first evaporator to a second evaporator, and the second evaporator to a second compression stage, the second pipes connecting the condenser to the pump, the pump to the first evaporator, the condenser to the expander, and the expander to the second evaporator, the refrigerant fluid circulating in the second pipes and the cooler device, while the compressed admission air flows through the first pipes and successively through the two evaporators in order firstly to vaporize the refrigerant fluid and secondly to cool the compressed admission air between the two compression stages, wherein the cooler device is a heat engine having three heat sources including a compression and drive means, the refrigerant fluid circulating through the compression and drive means, the second pipes connecting the compression and drive means to the first evaporator, to the second evaporator, and to the condenser.

2. The power plant according to claim 1, wherein the compression and drive means is an ejector.

3. The power plant according to claim 1, wherein the compression and drive means comprise a positive displacement expander connected to the first evaporator by the second pipes and a positive displacement compressor connected to the second evaporator by the second pipes, the positive displacement expander and the positive displacement compressor being connected by the second pipes to the condenser, the positive displacement expander and the positive displacement compressor being mechanically constrained together in rotation, the positive displacement expander being driven in rotation by the refrigerant fluid leaving the first evaporator, and the refrigerant fluid leaving the second evaporator circulating through the positive displacement compressor.

4. The power plant according to claim 3, wherein the cooler device includes a mechanical transmission shaft, the positive displacement expander being mechanically connected in rotation with the mechanical transmission shaft.

5. The power plant according to claim 4, wherein the cooler device includes clutch means constraining the positive displacement expander in rotation with the mechanical transmission shaft.

6. The power plant according to claim 4, wherein the cooler device includes a fan system for ventilating the condenser, the fan system being mechanically constrained in rotation with the mechanical transmission shaft.

7. The power plant according to claim 1, wherein the power plant includes third pipes, the third pipes being suitable for connecting the second pipes between the condenser and the pump to an additional system, the refrigerant fluid circulating in the third pipes and the additional system.

8. The power plant according to claim 7, wherein the power plant includes at least one main power transmission gearbox, the additional system is the main gearbox, the refrigerant fluid circulating through the third pipes and the main gearbox in order to cool the main gearbox.

9. The power plant according to claim 7, wherein the power plant is for fitting to a rotary wing aircraft having at least one cabin and at least one heat exchanger for cooling the cabin, the additional system is each heat exchanger, and the third pipes are suitable for connecting the second pipes between the condenser and the pump to each heat exchanger, the refrigerant fluid circulating in the third pipes and each heat exchanger in order to cool the cabin.

10. The power plant according to claim 1, wherein the condenser is a heat exchanger for exchanging heat between the refrigerant fluid and a secondary fluid, and the power plant includes fourth pipes connected to the condenser in order to channel and direct the secondary fluid to an auxiliary device.

11. The power plant according to claim 10, wherein the power plant is for a rotary wing aircraft having at least one cabin, and the fourth pipes are suitable for channeling and directing the secondary fluid to the cabin in order to heat the cabin.

12. The power plant according to claim 1, wherein the condenser is a heat exchanger for exchanging heat between the refrigerant fluid and ambient air surrounding the power plant.

13. A cooling method for cooling admission air to a fuel-burning engine of a power plant, the method comprising the following steps:
    compressing the admission air in a compressor of the power plant, the compressor having two compression stages;
    causing a refrigerant fluid to circulate in a cooler device for cooling the compressed admission air for the fuel-burning engine; and
    causing the compressed admission air to flow in succession through first and second evaporators of the cooler device between the two compression stages in order firstly to vaporize the refrigerant fluid and secondly to cool the compressed admission air;
    the method further comprising the following steps:
    condensing the refrigerant fluid by exchanging heat energy with a first heat source;
    compressing a first portion of the refrigerant fluid;
    vaporizing the first portion of the refrigerant fluid by exchanging heat energy with a second heat source, the second heat source being the compressed admission air flowing through the first evaporator;
    expanding a second portion of the refrigerant fluid;
    vaporizing the second portion of the refrigerant fluid by exchanging heat energy with a third heat source, the third heat source being the compressed admission air flowing through the second evaporator; and
    compressing and driving the second portion of the refrigerant fluid by means of energy in the first portion of the refrigerant fluid, and then mixing together the second portion of the refrigerant fluid and the first portion of the refrigerant fluid.

14. The cooling method according to claim 13, including the step of compressing and driving the second portion of the refrigerant fluid by means of the energy in the first portion of the refrigerant fluid, and mixing together the second portion of the refrigerant fluid and the first portion of the refrigerant fluid by means of an ejector.

15. The cooling method according to claim 13, including the step of compressing and driving the second portion of the refrigerant fluid by means of the energy in the first portion of the refrigerant fluid by using a positive displacement expander and a positive displacement compressor that are mechanically constrained together in rotation, the positive displacement expander being driven in rotation by the first portion of the refrigerant fluid, and the second portion of the refrigerant fluid circulating through the positive displacement compressor, and then mixing together the second portion of the refrigerant fluid and the first portion of the refrigerant fluid.

16. The cooling method according to claim 15, including the step of using a portion of the mechanical energy available from the positive displacement expander, the positive displacement expander being mechanically connected in rotation with a mechanical transmission shaft.

17. The cooling method according to claim 13, including the step of using heat discharged while condensing the refrigerant fluid for an auxiliary heating function.

18. The cooling method according to claim 17, wherein the auxiliary heating function is heating a cabin of an aircraft.

19. The cooling method according to claim 13, including the step of using a portion of heat energy of the refrigerant fluid for at least one additional heat exchange function.

20. The cooling method according to claim 19, wherein the additional heat exchanger function is cooling a main power transmission gearbox of the power plant.

21. The cooling method according to claim 19, wherein the cooling method is used for cooling compressed admission air for the fuel-burning engine forming part of a rotary wing aircraft, the additional cooling function being cooling a cabin of the rotary wing aircraft.

* * * * *